United States Patent
Shao et al.

(10) Patent No.: US 12,242,992 B2
(45) Date of Patent: Mar. 4, 2025

(54) METHOD AND INTERNET OF THINGS SYSTEM FOR MANAGING INSPECTION ROUTES BASED ON GAS GEOGRAPHIC INFORMATION SYSTEM (GIS)

(71) Applicant: CHENGDU QINCHUAN IOT TECHNOLOGY CO., LTD., Sichuan (CN)

(72) Inventors: Zehua Shao, Chengdu (CN); Yaqiang Quan, Chengdu (CN); Bin Liu, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/594,012

(22) Filed: Mar. 4, 2024

(65) Prior Publication Data
US 2024/0202629 A1  Jun. 20, 2024

Related U.S. Application Data

(63) Continuation of application No. 18/358,007, filed on Jul. 24, 2023, now Pat. No. 11,954,628.

(30) Foreign Application Priority Data

Jun. 25, 2023 (CN) .......................... 202310747064.7

(51) Int. Cl.
*G06Q 10/0631* (2023.01)
*G06N 5/022* (2023.01)

(52) U.S. Cl.
CPC ....... *G06Q 10/06316* (2013.01); *G06N 5/022* (2013.01)

(58) Field of Classification Search
CPC .. G06Q 10/06316; G06Q 10/06; G06Q 50/06; G06N 5/022; G06N 3/044; G06N 3/084; G06N 3/09; G16Y 10/35
See application file for complete search history.

(56) References Cited

U.S. PATENT DOCUMENTS

| 7,920,983 B1 | 4/2011 | Peleg et al. |
| 9,041,794 B1 | 5/2015 | Olsson et al. |

(Continued)

FOREIGN PATENT DOCUMENTS

| CA | 2277713 C | 10/2009 | |
| CA | 2811738 A1 * | 2/2012 | ............. G06T 7/408 |

(Continued)

OTHER PUBLICATIONS

JP 7328645 B1 with English translation; date filed Nov. 16, 2022; date published Aug. 17, 2023. (Year: 2023).*

(Continued)

*Primary Examiner* — Calvin Cheung
(74) *Attorney, Agent, or Firm* — METIS IP LLC

(57) ABSTRACT

The embodiment of the present disclosure provides a method and Internet of Things system for managing inspection route based on a gas Geographic Information System (GIS). The method is executed by a smart gas safety management platform of the Internet of Things system, comprising: determining track information of an inspector according to location data of the inspector; in response to the track information satisfying a preset requirement, determining a recommended inspection route based on the track information and gas monitoring data, and prompt the recommended inspection route through a display screen based on a first display parameter; in response to the track infor- (Continued)

mation not satisfying the preset requirement, determining a display condition of the display screen based on a second display parameter.

12 Claims, 5 Drawing Sheets

(56) References Cited

U.S. PATENT DOCUMENTS

| | | | |
|---|---|---|---|
| 2004/0236620 A1 | 11/2004 | Chauhan et al. | |
| 2012/0062223 A1* | 3/2012 | Olsson | G01V 3/08 |
| | | | 324/252 |
| 2013/0050478 A1 | 2/2013 | Tadepalli | |
| 2013/0211797 A1 | 8/2013 | Scolnicov et al. | |
| 2018/0332370 A1 | 11/2018 | Shao | |
| 2022/0020271 A1 | 1/2022 | Foley et al. | |
| 2023/0014580 A1* | 1/2023 | Zhu | G01C 21/3867 |

FOREIGN PATENT DOCUMENTS

| | | |
|---|---|---|
| CN | 203644086 U | 6/2014 |
| CN | 203720889 U | 7/2014 |
| CN | 104392507 A | 3/2015 |
| CN | 104879566 A | 9/2015 |
| CN | 105118108 A | 12/2015 |
| CN | 106897778 A | 6/2017 |
| CN | 108133522 A | 6/2018 |
| CN | 108230482 A | 6/2018 |
| CN | 108830462 A | 11/2018 |
| CN | 110737738 A | 1/2020 |
| CN | 111552216 A | 8/2020 |
| CN | 112799365 A | 5/2021 |
| CN | 115471982 A | 12/2022 |
| CN | 115661964 A | 1/2023 |
| CN | 115775088 A | 3/2023 |
| CN | 115899595 A | 4/2023 |
| CN | 115907264 A | 4/2023 |
| CN | 116011740 A | 4/2023 |
| CN | 116308965 A | 6/2023 |
| JP | 2018091721 A | 6/2018 |
| KR | 20130055933 A | 5/2013 |
| KR | 20200102201 A | 8/2020 |
| KR | 102232372 B1 | 3/2021 |
| WO | 2012148982 A2 | 11/2012 |
| WO | 2017171734 A1 | 10/2017 |
| WO | WO-2019051134 A1 * | 3/2019 ........... G01C 15/008 |
| WO | WO-2019142100 A1 * | 7/2019 ......... G01N 33/0075 |

OTHER PUBLICATIONS

KR 101819566 B1 with English translation; date filed Oct. 12, 2017; date published Jan. 18, 2018. (Year: 2018).*
KR 20200102201 A with English translation; date filed Feb. 21, 2019; date published Aug. 31, 2020. (Year: 2020).*
KR 20110105959 A with English translation; date filed Mar. 22, 2010; date published Sep. 28, 2011. (Year: 2011).*
Li, Yong et al., Research on Application of Gas Intelligent Inspection System, Bulletin of Surveying and Mapping, 2012, 4 pages.
Pan, Chaochao, Design and Implementation of Intelligent Terminal in Gas Pipeline Emergency Inspection and Assignment System, China Excellent Master's Dissertation Full-text Database Engineering Technology II , 2012, 73 pages.
Notification to Grant Patent Right for Invention in Chinese Application No. 202310747064.7 mailed on Aug. 7, 2023, 6 pages.
First Office Action in Chinese Application No. 202310747064.7 mailed on Jul. 28, 2023, 11 pages.

* cited by examiner

METHOD AND INTERNET OF THINGS SYSTEM FOR MANAGING INSPECTION ROUTES BASED ON GAS GEOGRAPHIC INFORMATION SYSTEM (GIS)

CROSS-REFERENCE TO RELATED APPLICATIONS

This application is a continuation of U.S. application Ser. No. 18/358,007, filed on Jul. 24, 2023, which claims priority of Chinese Patent Application No. 202310747064.7, filed on Jun. 25, 2023, the entire contents of which are incorporated herein by reference.

TECHNICAL FIELD

The present disclosure relates to the field of gas management system, and in particular, to a method and an Internet of Things system for managing inspection route based on a gas Geographic Information System (GIS).

BACKGROUND

During an operation of a gas pipeline network, in order to ensure safe operation, it is necessary to conduct an inspection of the gas pipeline network, for example, it is to determine whether there is a crack or pipeline damage in the gas pipeline network through the inspection. During a process of manual inspection, if an inspector deviates from a route or is located in a complicated situation such as a complex branch, the efficiency and quality of the inspection may be greatly affected.

Therefore, it is hoped to provide a managing method for inspection route based on a gas GIS, which can record a track of the inspector and recommend an inspection route to the inspector when a complicated situation occurs.

SUMMARY

One or more embodiments of the present disclosure provide a management method for inspection route based on a gas Geographic Information System (GIS). The method is executed by a smart gas safety management platform of an Internet of Things system for managing inspection route based on a gas GIS, comprising: determining track information of an inspector according to location data of the inspector, wherein the location data is obtained based on an inspection device, the location data includes at least one of satellite positioning information, motion information or orientation information of the inspector; in response to the track information satisfying a preset requirement, determining a recommended inspection route based on the track information and gas monitoring data, and prompting the recommended inspection route through a display screen based on a first display parameter; in response to the track information not satisfying the preset requirement, determining a display condition of the display screen based on a second display parameter.

One or more embodiments of the present disclosure provides an Internet of Things system for managing inspection route based on a gas Geographic Information System (GIS), wherein the Internet of Things system includes a smart gas safety management platform, and the smart gas safety management platform is configured to: determine track information of an inspector according to location data of the inspector, wherein the location data is obtained based on an inspection device, the location data including at least one of satellite positioning information, motion information, or orientation information of the inspector; and in response to the track information satisfying a preset requirement, determine a recommended inspection route based on the track information and gas monitoring data, and prompt the recommended inspection route through a display screen based on a first display parameter; and in response to the track information not satisfying the preset requirement, determine a display condition of the display screen based on a second display parameter.

BRIEF DESCRIPTION OF THE DRAWINGS

The present disclosure will be further illustrated by way of exemplary embodiments, which will be described in detail with the accompanying drawings. These embodiments are non-limiting, and in these embodiments, the same number indicates the same structure, wherein.

DETAILED DESCRIPTION

Figure 1:
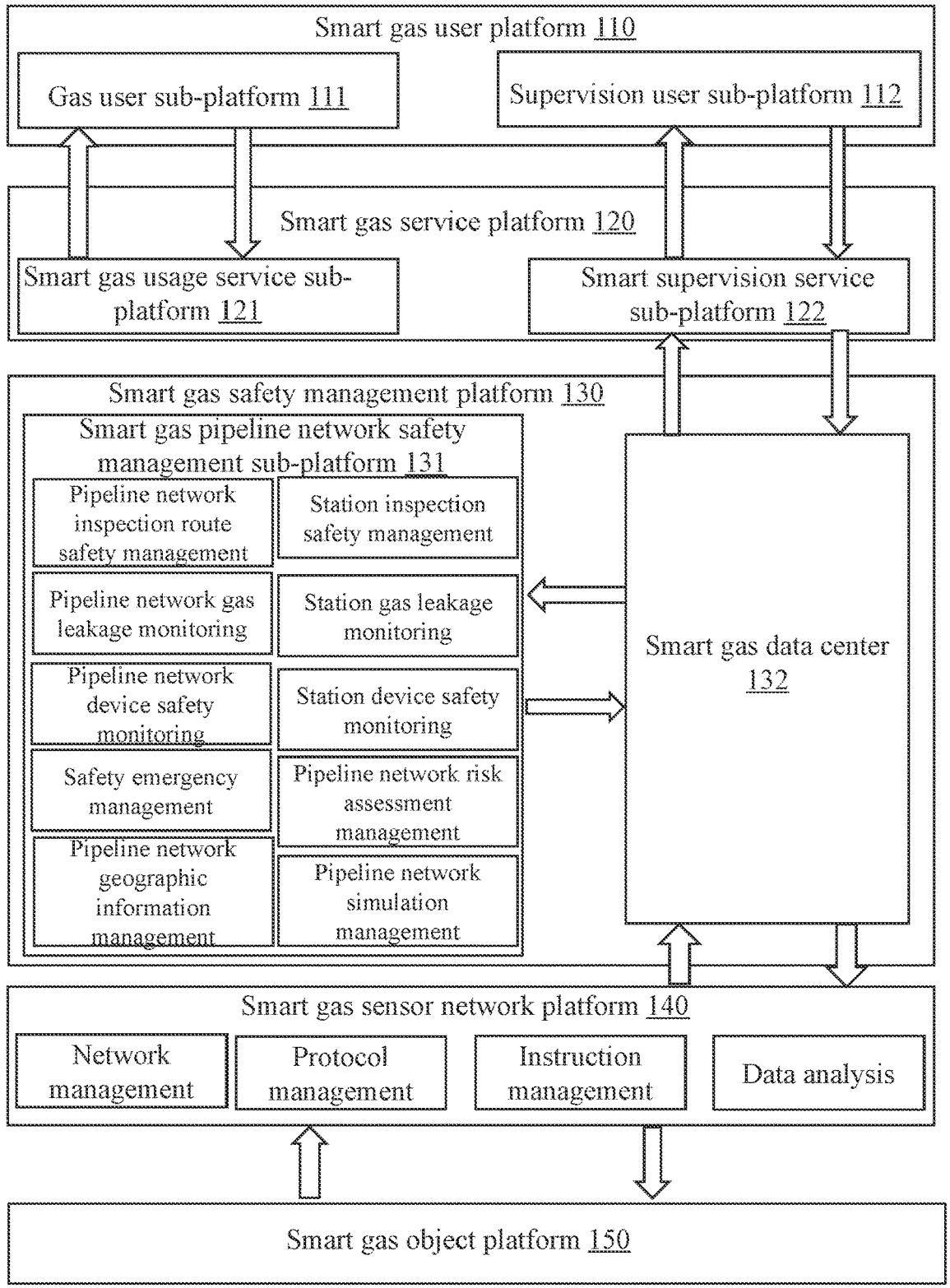
FIG. 1 is a structural diagram illustrating an exemplary Internet of Things system for smart gas safety inspection route based on a Geographic Information System (GIS) according to some embodiments of the present disclosure.

In order to more clearly illustrate technical solutions of the embodiments of the present disclosure, the following briefly introduces the drawings that need to be used in the description of the embodiments. Apparently, the accompanying drawings in the following description are only some examples or embodiments of the present disclosure, and those skilled in the art may also apply the present disclosure to other similar scenarios. Unless obviously obtained from the context or the context illustrates otherwise, the same numeral in the drawings refers to the same structure or operation.

It should be understood that "system", "device", "unit" and/or "module" as used herein is a method for distinguishing different components, elements, parts, parts, or assemblies of different levels. However, the words may be replaced by other expressions if other words can achieve the same purpose.

The flowchart is used in the present disclosure to illustrate the operations performed by the system according to the embodiment of the present disclosure. It should be understood that the preceding or following operations are not necessarily performed in the exact order. Instead, various steps may be processed in reverse order or simultaneously. At the same time, other operations may be added to these procedures, or a certain step or steps can be removed from these procedures.

FIG. 1 is a structural diagram illustrating an exemplary Internet of Things system for smart gas safety inspection route based on a Geographic Information System (GIS) according to some embodiments of the present disclosure. In some embodiments, as shown in FIG. 1, the Internet of Things system 100 for smart gas safety inspection route based on a GIS include a smart gas user platform 110, a smart gas service platform 120, a smart gas safety management platform 130, a smart gas sensor network platform 140, and a smart gas object platform 150.

The smart gas user platform 110 is a platform for interacting with a user. In some embodiments, the smart gas user platform 110 may be configured as a terminal device.

In some embodiments, the smart gas user platform 110 may include a gas user sub-platform 111 and a supervision user sub-platform 112.

The gas user sub-platform 111 is a platform that provides a gas user with data related to gas usage and a solution to a gas problem. The gas user may be an industrial gas user, a commercial gas user, an ordinary gas user, etc. In some embodiments, the gas user sub-platform 111 may correspond to and interact with a smart gas usage service sub-platform 121 to obtain a service for safe gas consumption.

The supervision user sub-platform 112 is a platform for a supervision user to supervise an operation of the entire Internet of Things system. The supervision user may be personnel of a safety management department. In some embodiments, the supervision user sub-platform 112 may correspond to and interact with a smart supervision service sub-platform 122 to obtain a service required by safety supervision.

In some embodiments, the smart gas user platform 110 may interact with the smart gas service platform 120, send a query instruction of gas pipeline network device safety management information to the smart gas service platform 120, and receive the gas pipeline network device safety management information uploaded by the smart gas service platform 120. In some embodiments, the gas pipeline network device safety management information may include gas pipeline network abnormality information and/or recommended inspection route information.

The smart gas service platform 120 is a platform for conveying the user's needs and control information. The smart gas service platform 120 may obtain the gas pipeline network device safety management information, etc. from the smart gas safety management platform 130 (e.g., the smart gas data center), and send the gas pipeline network device safety management information, etc. to the smart gas user platform 110 (e.g., the gas user sub-platform).

In some embodiments, the smart gas service platform 120 may include the smart gas usage service sub-platform 121 and the smart supervision service sub-platform 122.

The smart gas usage service sub-platform 121 is a platform that provides a gas usage service for the gas user.

The smart supervision service sub-platform 122 is a platform that provides a supervision need for the supervision user.

In some embodiments, the smart gas service platform 120 may interact with the smart gas safety management platform 130, issue the query instruction of gas pipeline network device safety management information to a smart gas data center 132, and receive the gas pipeline network device safety management information uploaded by the smart gas data center 132.

The smart gas safety management platform 130 is a platform that coordinates and integrates connection and collaboration between various functional platforms, gathers all information of an Internet of Things, and provides functions of perception management and control management for an operational system of the Internet of Things.

In some embodiments, the smart gas safety management platform 130 may include a smart gas pipeline network safety management sub-platform 131 and the smart gas data center 132.

In some embodiments, the smart gas pipeline network safety management sub-platform 131 may include but is not limited to a pipeline network gas leakage monitoring module, a safety emergency management module, a pipeline network risk assessment management module, a pipeline network geographic information management module, a pipeline network device safety monitoring module, a pipeline network risk assessment management module.

The smart gas data center 132 may be used to store and manage all operation information of the Internet of Things system 100. In some embodiments, the smart gas data center may be configured as a storage device for storing data related to safety management of gas pipeline network devices, or the like. For example, the smart gas data center 132 may store information such as a track of the inspector, a recommended inspection route, and an operation failure of a gas pipeline network.

In some embodiments, the smart gas pipeline network safety management sub-platform 131 may interact with the smart gas data center 132 bidirectionally, the smart gas pipeline network safety management sub-platform 131 obtains gas pipeline network safety management data from the smart gas data center 132 and feeds back gas pipeline network safety management data.

In some embodiments, the smart gas safety management platform 130 may exchange information with the smart gas service platform 120 and the smart gas sensor network platform 140 respectively through the smart gas data center 132. For example, the smart gas data center 132 may send recommended inspection route information and/or prompt information to the smart gas service platform 120. As another example, the smart gas data center may send an instruction for obtaining data related to the recommended inspection route to the smart gas sensor network platform 140 to obtain monitoring data of a gas device and/or positioning information of the inspector.

The smart gas sensor network platform 140 may realize functions of sensor communication of perception information and sensor communication of control information. In some embodiments, the smart gas sensor network platform 140 may be configured as a communication network and gateway.

In some embodiments, the smart gas sensor network platform 140 may interact downward with the smart gas object platform 150, send an instruction of operation-related data of a gas pipeline network device to the smart gas object platform 150, and receive the operation-related data of the gas pipeline network device uploaded by the smart gas object platform. In some embodiments, the operation-related data of the gas pipeline network device may include the monitoring data of the gas pipeline network and the positioning information of the inspector. In some embodiments, the smart gas sensor network platform 140 may include modules such as network management, protocol management, command management, data analysis, etc.

In some embodiments, the smart gas sensor network platform 140 may obtain information and data from a gas GIS, upload the information and data to the smart gas safety management platform 130 for processing, and then obtain the recommended inspection route. The supervision user may use the gas GIS to conduct a three-dimensional visualization management of information related to the gas pipeline network, view geographic information of a gas pipeline and device and its own attribute information in real-time, provide data support for an on-site operation, and query historical safe operation data and current safe operation data of the gas pipeline network obtained by the smart gas object platform.

The smart gas object platform 150 is a functional platform for generating the perception information and executing the control information. In some embodiments, the smart gas object platform 150 may be configured as various types of gas pipeline network devices, monitoring devices, and inspection devices. The inspection device may include a satellite positioning device, a motion sensing device, a direction sensor device, etc., or any combination thereof.

In some embodiments of the present disclosure, the Internet of Things system 100 for smart gas safety inspection route based on a GIS can form a closed loop of information operation between the smart gas object platform and the smart gas user platform, and coordinate and operate regularly under unified management of the smart gas safety management platform to realize informatization and intellectualization of the recommended inspection route.

Figure 2:
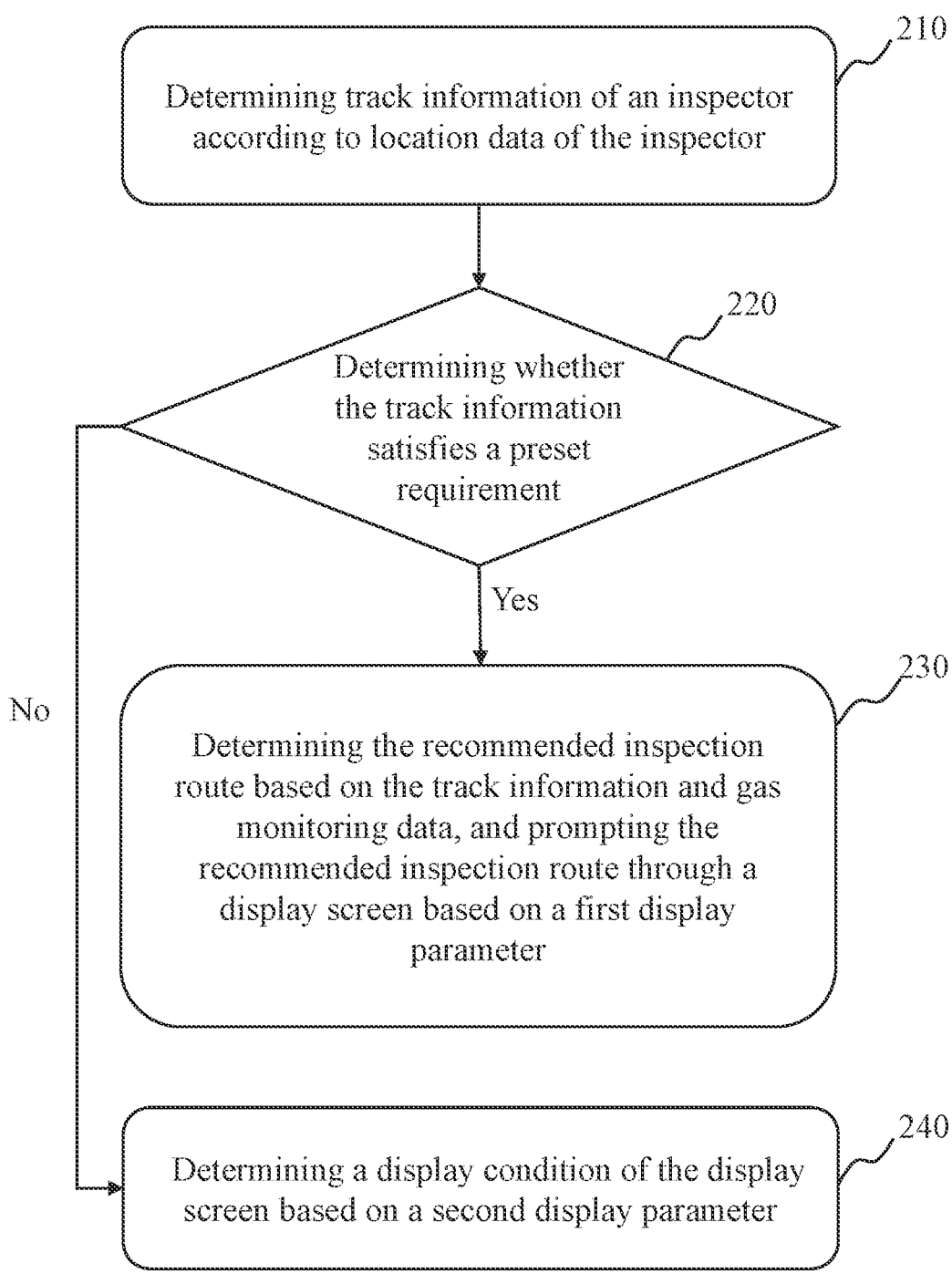
FIG. 2 is a flowchart illustrating an exemplary method for smart gas safety inspection route based on a GIS according to some embodiments of the present disclosure.

FIG. 2 is a flowchart illustrating an exemplary method for smart gas safety inspection route based on a GIS according to some embodiments of the present disclosure. As shown in FIG. 2, a process 200 includes the following steps. In some embodiments, the process 200 may be executed by a smart gas safety management platform.

Step 210, determining track information of an inspector according to location data of the inspector.

The location data of the inspector may include at least one of satellite positioning information, motion information or orientation information of the inspector. The motion information is information related to the motion state of the inspector, such as a motion speed, a motion direction, an azimuth, etc. The orientation information is information related to an orientation of the inspector, such as east, west, north, etc.

In some embodiments, the location data may be obtained based on an inspection device.

The inspection device is a device carried by the inspector during an inspection. In some embodiments, the inspection device may include one or more of a satellite positioning device, a motion sensing device, a direction sensor device, and a display screen.

The satellite positioning device may include a satellite positioning system, which is configured to obtain positioning information of the inspector.

The motion sensing device may include a motion sensor for monitoring the motion information such as the motion speed, an acceleration, a displacement, etc. of the inspector.

The direction sensor device may include a direction sensor for monitoring the orientation information of the inspector.

The track information is information representing an action track of the inspector during the inspection. In some embodiments, the track information may include physical track information.

In some embodiments, the smart gas safety management platform may be configured to dynamically determine the track information of the inspector according to the location data of the inspector. For example, the smart gas safety management platform may determine corresponding track information by combining with a location of an inspection target or information of a nearby road in a gas pipeline network and station map based on a plurality of reference location points obtained by satellite positioning.

Figure 3:
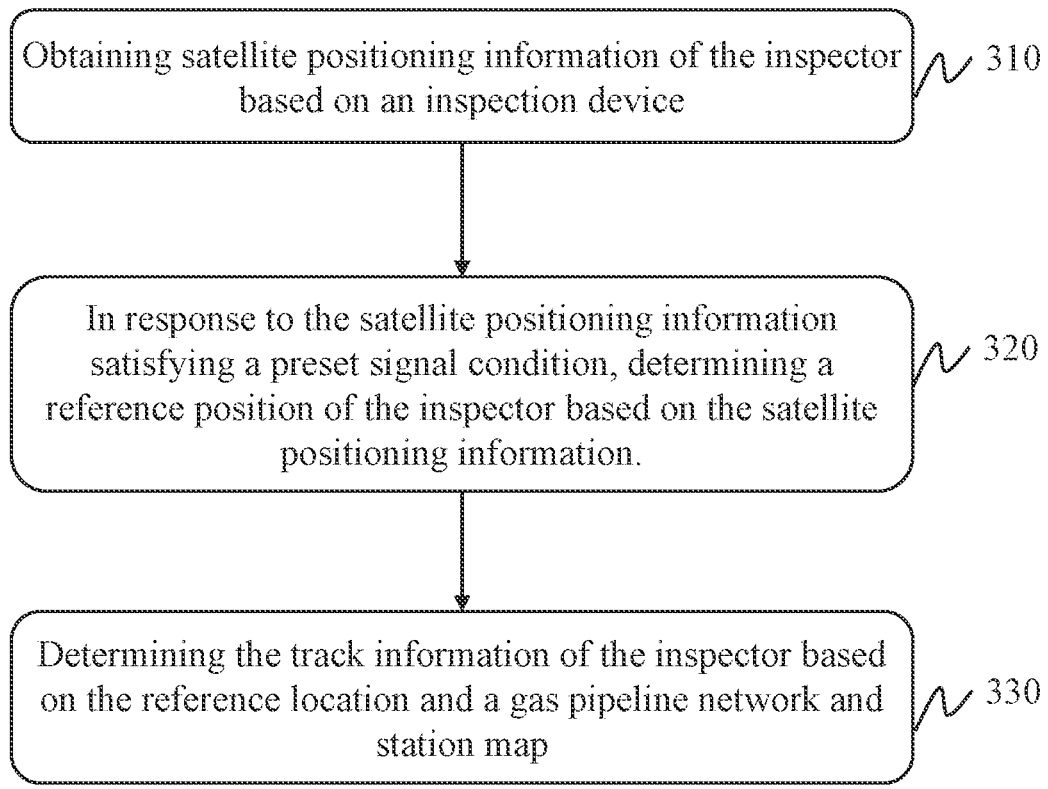
FIG. 3 is a flowchart illustrating an exemplary process for determining track information of an inspector according to some embodiments of the present disclosure.

For other embodiments of determining the track information of the inspector, please refer to FIG. 3 and related descriptions.

Step 220, determining whether the track information satisfies a preset requirement.

The preset requirement refers to a condition used to determine whether a recommended inspection route needs to be determined. For example, the preset requirement may include that current location information of the inspector (i.e., the latest location point in the track information) is located at a complex branch or deviates from a route.

In some embodiments, the preset requirement may be constructed based on a real-time inspection route feature of the inspector, a current location, and a gas pipeline feature at the current location, and constructed in combination with an actual management requirement.

The real-time inspection route feature refers to a deviation between the track information of the inspector and an inspection route, for example, a degree of overlapping between a location point in the track information and the inspection route, a difference between a non-overlapping location track information and the inspection route, a length of the non-overlapping track, etc. It should be noted that if a length of non-overlapping track between the location point in the track information and the inspection route is short, it may be a track change due to a road change, which is not considered as a deviation from the inspection route.

The gas pipeline feature is a feature used to judge the complexity of a pipeline. In some embodiments, the gas pipeline feature may include at least one of a count of gas pipelines, a size of a pipeline, a count of devices on a pipeline, or a count of branch joints.

Step 230, in response to the track information satisfying the preset requirement, determining the recommended inspection route based on the track information and gas monitoring data, and prompting the recommended inspection route through a display screen based on a first display parameter.

The gas monitoring data refers to data obtained by monitoring the gas pipeline network. In some embodiments, the gas monitoring data may include gas feature values at different points in the gas pipeline network, such as temperature, stress, or pressure.

The recommended inspection route is a route suitable for the inspector to conduct the inspection in a complex situation.

The first display parameter is a relevant parameter for prompting the inspector. In some embodiments, the first display parameter may include one or more of highlighting, bolding, an eye-catching color, or the like.

In some embodiments, the smart gas safety management platform may prompt the recommended inspection route in various ways based on the first display parameter, such as a sound and light prompt.

In some embodiments, the smart gas safety management platform may determine the recommended inspection route based on the track information and the gas monitoring data.

For example, the smart gas safety management platform may use a current location in the track information as a starting point, and inspect a route of each location in accordance with the distance from near to far as the recommended inspection route.

Figure 4:
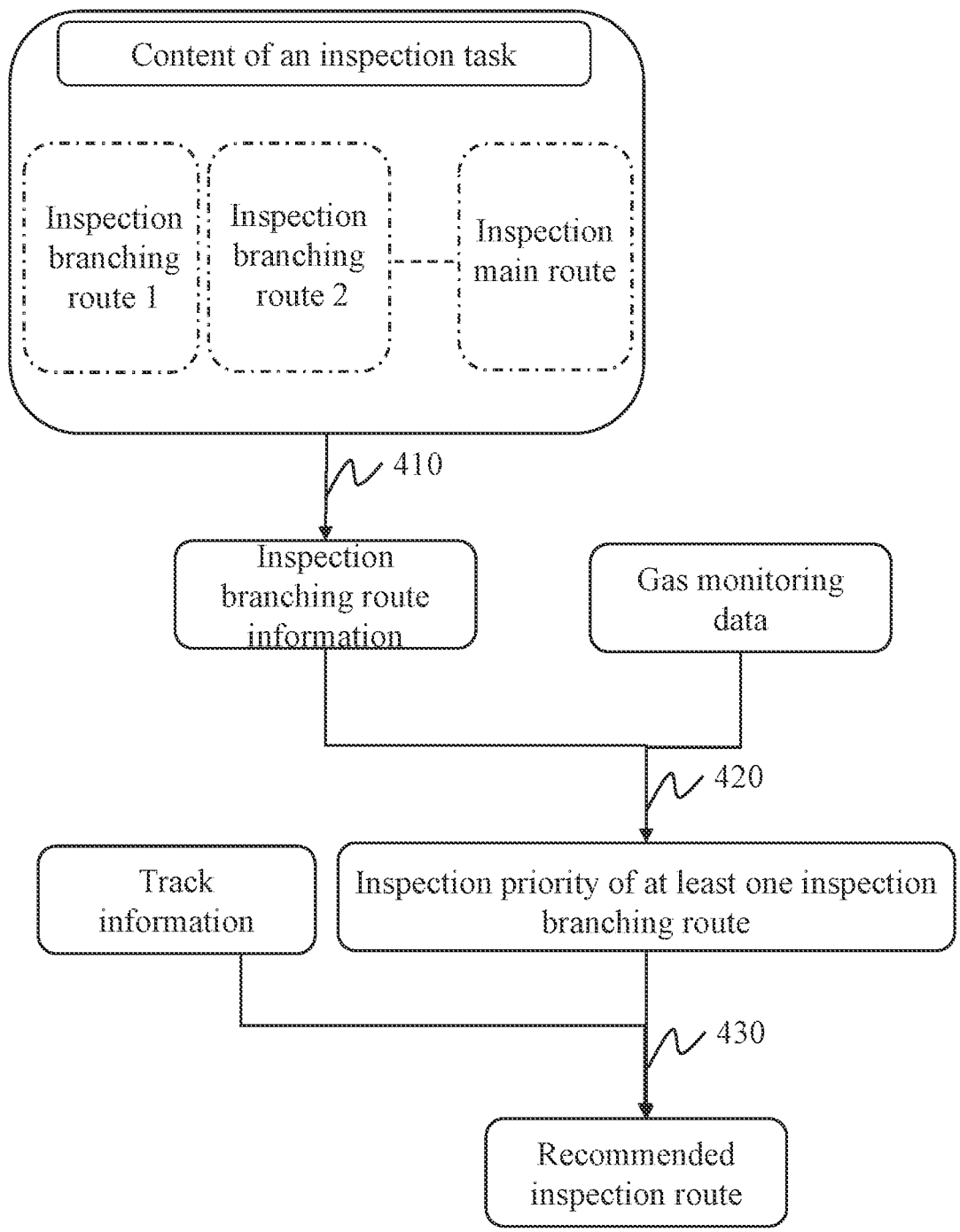
FIG. 4 is a schematic diagram illustrating an exemplary determination of a recommended inspection route according to some embodiments of the present disclosure.

For more embodiments of determining the recommended inspection route, please refer to FIG. 4 and related descriptions.

Step 240, in response to the track information not satisfying the preset requirement, determining a display condition of the display screen based on a second display parameter.

The second display parameter may include one or more of autonomous sleep, low brightness, or the like.

In some embodiments, the smart gas safety management platform may determine the display condition of the display screen through a related instruction based on the second display parameter. For example, the smart gas safety management platform may determine that the display screen is in a display condition of autonomous sleep through an instruction of autonomous sleep.

In some embodiments of the present disclosure, the recommended inspection route is determined based on dual factors of an inspection priority and the track information, and the inspector is prompted about the recommended inspection route, so that the inspector can receive a timely reminder when the inspector deviates from the route or is located in the complex situation such as the complex branch, which is beneficial to improve the inspection efficiency.

FIG. 3 is a flowchart illustrating an exemplary process of determining track information of an inspector according to some embodiments of the present disclosure. In some embodiments, a process 300 may be executed by a smart gas safety management platform. As shown in FIG. 3, the process 300 includes the following steps.

Step 310, obtaining satellite positioning information of the inspector based on an inspection device.

In some embodiments, the smart gas safety management platform may obtain the satellite positioning information of the inspector through a satellite positioning device in the inspection device.

Step 320, in response to the satellite positioning information satisfying a preset signal condition, determining a reference position of the inspector based on the satellite positioning information.

The preset signal condition refers to a signal strength threshold that the satellite positioning information needs to satisfy. For example, the preset signal condition may be that the signal strength of the satellite positioning information is greater than 1 dbm. Generally, the greater the signal strength, the more accurate the satellite positioning information. In some embodiments, the preset signal condition may be determined according to experience or an actual requirement.

The reference location of the inspector refers to a relative geographic location of the inspector. For example, the relative geographic location may be 107.33.40 east longitude, 33.13.34 north latitude, and an altitude of 500 m.

In some embodiments, the satellite positioning information may include longitude and latitude information, altitude information, etc. of the inspectors. According to the longitude, latitude, and altitude information, the smart gas safety management platform may directly determine the relative geographic location of the inspector, thereby determining the reference location of the inspector.

Step 330, determining the track information of the inspector based on the reference location and a gas pipeline network and station map.

The gas pipeline network and station map refers to a map containing gas pipeline network information. In some embodiments, the gas pipeline network and station map may include location information of a gas pipeline network, a gas station, a pressure regulating station, and other gas devices. In some embodiments, the gas pipeline network and station map may be obtained based on a gas GIS.

In some embodiments, the smart gas safety management platform may make a one-to-one correspondence between the reference location of the inspector and coordinate location on the gas pipeline network and station map, and determine a location passed by the inspector on the gas pipeline network and station map in combination with road or street information, location information of a gas device on the gas pipeline network and station map, etc. Furthermore, the smart gas safety management platform may connect the locations passed by the inspector on the gas pipeline network and station map according to a time sequence of the inspection to determine the track information of the inspector.

In some embodiments, the smart gas safety management platform may further use the reference location as a reference, and determine a calculated location of the inspector according to motion information and orientation information of the inspector; determine at least one inspection target near the calculated location that satisfies a preset location condition based on the gas pipeline network and station map; in response to a count of the at least one inspection target near the calculated location that satisfies the preset location condition satisfying a preset count requirement, obtain at least one image of the at least one inspection target by a photographing device; and determine the track information of the inspector based on the at least one image of the at least one inspection target and the calculated location.

The calculated location refers to a geographical location of the inspector estimated by calculation. For example, the smart gas safety management platform may estimate a possible calculated location of the inspector at the next moment by combining an orientation and motion speed of the inspector at a certain reference location.

The inspection target refers to a device that needs to be inspected. In some embodiments, the smart gas safety management platform may determine the inspection target based on a preset rule. For example, the preset rule may be whether there is an abnormality in a gas device, whether a usage time of the gas device exceeds a time threshold, or the like.

If there is an abnormality in the gas device and/or the usage time exceeds the time threshold, the smart gas safety management platform may determine the gas device as the inspection target. The gas device may include but is not limited to a gas pipeline, a gas meter, a gas pressure regulating station, and other related devices.

The preset location condition refers to a distance requirement of a preset inspection target relative to the inspector. For example, the preset location condition may be within a radius of 10 meters from the calculated location, within a radius of 5 meters from the calculated location, etc. In some embodiments, the preset location condition may be set according to experience or an actual need.

The preset count requirement refers to a preset count threshold. In some embodiments, the preset count requirement may be that the count of inspection targets is greater than zero. For example, when there are one or more inspection targets within a radius of 50 meters from the calculated location as a center, the preset count requirement is satisfied. In some embodiments, the preset count requirement may be set according to experience or an actual need.

In some embodiments, the orientation information of the inspector may be determined based on a direction sensor (e.g., a compass). In some embodiments, the motion information of the inspector, including real-time speed, acceleration, etc., may be determined through a motion sensing device (e.g., a speed sensor). For each of a plurality of reference locations, starting from the reference location, according to the motion information and orientation information of the inspector, a calculated location of the inspector corresponding to the reference location at the next moment may be calculated.

In some embodiments, a time interval between the reference location and the calculated location corresponding to the reference location may be set according to experience or an actual condition. For example, the calculated location may include a location change within the next 2 hours.

When a count of inspection targets corresponding to a certain calculated location satisfies the preset count requirement, the smart gas safety management platform may obtain an image of an inspection target that satisfies the preset location condition through the photographing device. In some embodiments, each of the at least one image of the inspection target may include one or more inspection targets satisfying the preset location condition. In some embodiments, the image of the inspection target may be obtained by the smart gas safety management platform through the photographing device held by the inspector.

In some embodiments, after the smart gas safety management platform obtains the calculated location of the inspector and the image of the inspection target, it may determine the track information of the inspector according to location information of a corresponding inspection target in the image of the inspection target and the calculated location. For example, the smart gas safety management platform may match street information corresponding to the location information of the corresponding inspection target in the image of the inspection target with geographical location information in the gas pipeline network and station map, and determine the track information of the inspector by connecting the calculated locations of the inspector in a chronological order.

In some embodiments of the present disclosure, the smart gas safety management platform may predict the calculated location by combining with the motion information and the orientation information of the inspector based on the reference location of the inspector. By referring to more information of the inspector during the inspection, the reference location obtained based on the satellite positioning information may be corrected, thereby improving the accuracy of the track information of the inspector.

The calculated location is estimated based on information of a current reference location, however, in an actual situation, there are still certain errors. In some embodiments, the smart gas safety management platform may further determine information matching the image of the inspection target in an inspection target database based on the at least one image of the inspection target, and thus determine an actual location of the inspection target, further determines at least one precise location of the inspector by combining with a relative location relationship between the inspection target and the photographing device, and finally determines the track information of the inspector based on the at least one precise location and the calculated location.

The inspection target database refers to a database containing data related to the inspection target. In some embodiments, the inspection target database may include image information of each inspection target at each shooting angle, precise location information of each inspection target, or the like. In some embodiments, the inspection target database may further include information such as a background reference object of the inspection target (e.g., buildings and trees around the inspection target). Since the image of the inspection target may contain a plurality of inspection targets of the same type (i.e., the same appearance), when a device number of an inspection target is not photographed, in order to distinguish inspection targets of the same type, different background reference information of the inspection targets may be used for judgment.

In some embodiments, information in the inspection target database may be obtained based on a manual labeling in advance.

In some embodiments, an image of the inspection target containing at least one inspection target is matched with image information of an inspection target in inspection target database, if the inspection target in the image of the inspection target matches the inspection target in the inspection target database, the smart gas safety management platform may determine precise location information of the pre-labeled inspection target in the inspection target database as an actual location of the inspection target in the image of the inspection target. In some embodiments, the image of the inspection target may be matched with the image information of the inspection target in the inspection target database target based on an image recognition algorithm.

In some embodiments, the relative location relationship between the inspection target and the photographing device may be determined according to the image of the inspection target. Specifically, according to an angle of the inspection target in the image and a perspective principle of shooting, a direction and approximate distance of the photographing device relative to the inspection target may be determined, thereby determining the relative location relationship between the inspection target and the photographing device. For example, the relative location relationship between the inspection target and the photographing device may be that the photographing device is 20 meters southeast of the inspection target.

In some embodiments, the smart gas safety management platform may directly determine a precise location of the photographing device by combining with the actual location of the inspection target according to the relative location relationship between the inspection target and the photographing device. For example, the relative location relationship between the inspection target and the photographing device is that the photographing device is 20 meters north of the inspection target, and the actual location of the inspection target is in a north-south street and 50 meters south of an intersection, then it may be determined the precise location of the photographing device is in a north-south street and 30 meters south of the intersection.

In some embodiments, when there is a plurality of inspection targets in the image of the inspection target (i.e., not less than two), the smart gas safety management platform may determine the relative location relationship among the plurality of inspection targets and the photographing device, and determine the precise location of the photographing device according to an extension line of a relative direction of the plurality of inspection targets and the photographing device. For example, the photographing device is in a southeast direction of an inspection target 1, and in a southwest direction of an inspection target 2, in the gas pipeline network and station map, the smart gas safety management platform takes the inspection target 1 and inspection target 2 as origin respectively, make the extension line of the southeast direction of the inspection target 1 and the extension line of the southwest direction of the inspection target 2, and determine an intersection point of the extension lines as a precise direction of the photographing device.

The smart gas safety management platform connects the precise location of the inspector with the calculated location of the inspector in a chronological order, and the track information of the inspector may be determined in the gas pipeline network and station map.

In some embodiments of the present disclosure, the smart gas safety management platform comprehensively considers the actual location of the inspection target to determine the precise location of the inspector, so that the precise location of the inspector is more authentic and accurate, thereby ensuring the accuracy of determining the track information of the inspector subsequently.

In some embodiments of the present disclosure, the smart gas safety management platform determines the reference location based on the satellite positioning information of the inspector, and further determines the calculated location based on the reference location, which can avoid inaccurately or impossible obtaining location information of the inspector when a satellite signal is weak, which improves the efficiency and accuracy of determining a track of the inspector.

FIG. 4 is a schematic diagram illustrating an exemplary determination of a recommended inspection route according to some embodiments of the present disclosure. In some embodiments, a process 400 may be executed by a smart gas safety management platform. As shown in FIG. 4, the process 400 includes the following steps.

Step 410, obtaining inspection branching route information based on a content of an inspection task.

In some embodiments, the content of the inspection task includes at least one inspection branching route connected with an inspection main route (e.g., inspection branching route 1, inspection branching route 2, . . . , shown in FIG. 4).

The inspection main route refers to a road corresponding to a main supply pipeline of gas, and the inspection branching route refers to a road corresponding to a branching supply pipeline of gas. In some embodiments, the at least one inspection branching route may be connected in pairs, or may be independent of each other.

The inspection branching route information refers to information related to the inspection branching route. In some embodiments, the inspection branching route information may include a road condition and environmental information of the inspection branching route. For example, a route length, environmental audio, environmental image, etc. of the inspection branching route. In some embodiments, the inspection branching route information may further include information of an inspection target in the inspection branching route, such as a count of inspection targets, device types, and device models in the inspection branching route.

Step 420: determining an inspection priority of the at least one inspection branching route based on the inspection branching route information and gas monitoring data.

The inspection priority refers to an importance level of an inspection route. The higher the inspection priority corresponding to the inspection route, the more prioritized the inspection. In some embodiments, the inspection priority may be represented by a natural value from 0 to 10, and a larger value indicates a higher inspection priority.

In some embodiments, the smart gas safety management platform may determine the inspection priority of the inspection branching route according to a fluctuation of monitoring data of a gas platform in the inspection branching route. The more serious the fluctuation of the monitoring data, the higher the inspection priority of the branching route.

In some embodiments, the smart gas safety management platform may further determine the inspection priority of the inspection branching route based on an abnormality probability of the inspection branching route. In some embodiments, the greater the abnormality probability, the higher the inspection priority of a corresponding inspection branching route.

In some embodiments, the smart gas safety management platform may further use an abnormality prediction model to process the inspection branching route information and the gas monitoring data to determine the abnormality probability of the inspection branching route, and then further determine the inspection priority of the inspection branching route. For contents of the abnormality prediction model, please refer to FIG. 5 and its related descriptions.

Step 430, determining the recommended inspection route based on the inspection priority and track information.

The recommended inspection route refers to a route with the best performance in a certain index or comprehensive judgment.

In some embodiments, the smart gas safety management platform may further first identify an inspection phase of the inspector; if the inspector is in the first phase of the inspection phase, a remote inspection branching route is obtained based on a precise location of the inspector, and the recommended inspection is determined according to a preset inspection rule according to an inspection priority of the remote inspection branching route.

The inspection phase refers to a state of a current inspection or an ongoing inspection operation. In some embodiments, a departure phase of an inspection may be the first phase, and a return phase of the inspection may be a second phase.

The remote inspection branching route refers to an inspection branching route that the inspector has not yet arrived and has not been inspected.

The preset inspection rule refers to a related rule used to determine the recommended inspection route. For example, the preset inspection rule may include inspecting branches whose priorities are higher than a priority threshold in order from near to far. In some embodiments, the preset inspection rule may be set according to an actual requirement or experience of inspection.

In some embodiments, the smart gas safety management platform may determine the recommended inspection route according to the inspection priority of the remote inspection branching route and the precise location of the inspector. The recommended inspection route includes that: in the first phase of the inspection, the remote inspection branching route is obtained based on the precise location of the inspector, and a branch that is far away from a current location and whose inspection priority is higher than the priority threshold is prioritized to be inspected based on the inspection priority of the remote inspection branching route, and then in the second phase of the inspection, branches that have not been inspected are inspected in turn until returning to a starting point of the inspection.

In some embodiments, the preset inspection rule is related to a count of inspection targets of the remote inspection branching route. When the count of inspection targets of the remote inspection branching route is greater than a preset count threshold, the preset inspection rule may include adjusting the inspection priority of the remote inspection branching route, prioritizing an inspection of the remote inspection branching route, so as to avoid affecting a timely inspection of a remote inspection branching route with a high abnormality probability.

In some embodiments, the preset count threshold may be determined according to an actual need or experience.

In some embodiments of the present disclosure, the smart gas safety management platform determines the recommended inspection route by combining the inspection phrase of the inspector and the count of inspection targets of the remote inspection branching route, comprehensively considering a distance between the inspector and the inspection target and a time that it may take, which not only avoids a waste of human resources, but also avoids an abnormal situation caused by an excessive inspection time, and further improves the efficiency of the inspection and the safety of gas usage.

In some embodiments of the present disclosure, the recommended inspection route is further determined by determining the inspection priority of the inspection branching route, which improves the efficiency of determining the inspection, reduces the probability of an accident, and improves the safety of gas usage.

Figure 5:
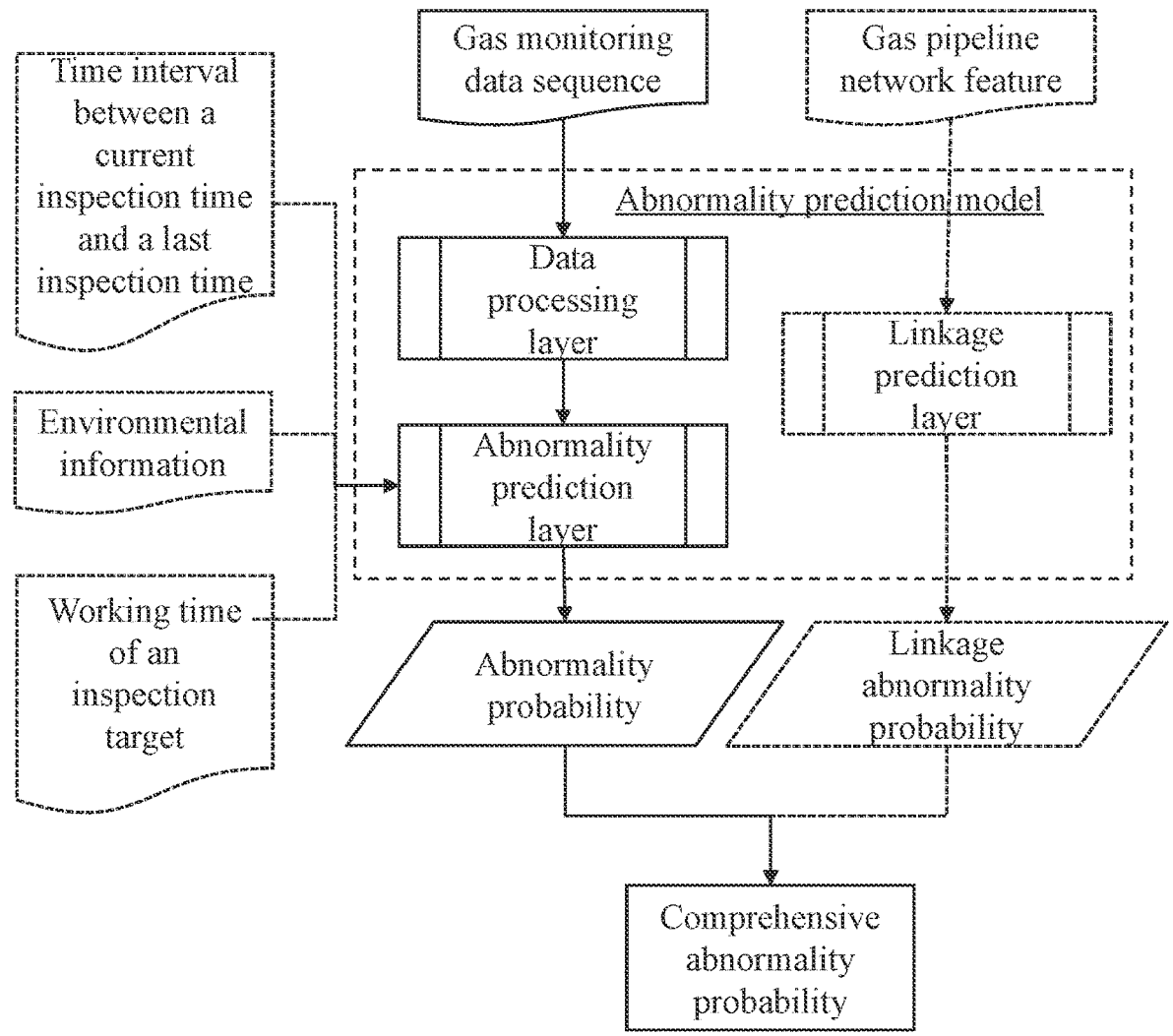
FIG. 5 is a schematic diagram illustrating an exemplary abnormality prediction model according to some embodiments of the present disclosure.

FIG. 5 is a schematic diagram illustrating an exemplary abnormality prediction model according to some embodiments of the present disclosure.

In some embodiments, a smart gas safety management platform may obtain a gas monitoring data sequence by processing gas monitoring data, and determine an abnormality probability of at least one inspection branching route by processing the gas monitoring data sequence and inspection branching route information through the abnormality prediction model, and determine an inspection priority of the inspection branching route according to the abnormality probability.

In some embodiments, the higher the abnormality probability of the inspection branching route, the higher a corresponding inspection priority. In some embodiments, the smart gas safety management platform may determine the inspection priority corresponding to the abnormality probability according to a preset rule (e.g., a preset table or formula).

In some embodiments, the smart gas safety management platform may determine the abnormality probability of the at least one inspection branching route through the abnormality prediction model. The abnormality prediction model may be a machine learning model.

As shown in FIG. 5, in some embodiments, the abnormality prediction model may predict an abnormality probability of any inspection branching route among at least one inspection branching route for which an abnormal situation needs to be predicted. An input of the abnormality prediction model may include the gas monitoring data sequence, and an output of the abnormality prediction model may include the abnormality probability.

A gas monitoring data sequence refers to a data sequence obtained by a gas monitoring device within a period of time. In some embodiments, the gas monitoring data sequence includes a device operation data sequence and a gas transmission data sequence of the inspection branching route.

In some embodiments, the smart gas safety management platform may obtain monitoring information of a gas pipeline network through a smart gas sensor network platform, then obtain monitoring data of an inspection branching route to be predicted from the monitoring information of the gas pipeline network, and obtain the gas monitoring data sequence by processing the monitoring data of the inspection branching route to be predicted.

In some embodiments, the abnormality prediction model may include a data processing layer and an abnormality prediction layer.

In some embodiments, the data processing layer may be a deep neural network (DNN). In some embodiments, an input of the data processing layer may be the input of the abnormality prediction model, i.e., a gas monitoring data sequence of any inspection branching route whose abnormality situation needs to be predicted, and an output of the data processing layer may include a data feature corresponding to the gas monitoring data sequence. The data feature may be used to represent a pipeline network feature of the inspection branching route.

In some embodiments, the data processing layer may be trained based on historical data through gradient descent or other feasible manners. A training sample may include a historical monitoring data sequence, and a training label may include a historical data feature corresponding to the historical monitoring data sequence labeled manually.

In some embodiments, the abnormality prediction layer may be a recurrent neural network (RNN). In some embodiments, an input of the abnormality prediction layer may include the output of the data processing layer, i.e., the data feature corresponding to the gas monitoring data sequence, and an output of the abnormality prediction layer is the abnormality probability of the inspection branching route. The output of the abnormality prediction layer may be used as the output of the abnormality prediction model.

In some embodiments, the input of the abnormality prediction layer may further include a time interval between a current inspection time and a last inspection time, environmental information, and a working time of an inspection target.

The time interval between the current inspection time and the last inspection time refers to a time interval between a time when the current inspection starts and a time when the last inspection ends. The environmental information refers to data related to the inspection route or a surrounding environment of the inspection target, such as environmental noise data, environmental air quality data, or the like. The working time of the inspection target refers to a time period from the latest startup to the latest shutdown of the inspection target, or a time period from the latest startup of the inspection target to a current time.

In some embodiments, the abnormality prediction model may further include a linkage prediction layer. In some embodiments, a linkage prediction layer may be a graph neural network (GNN). In some embodiments, an input of the linkage prediction layer may include a gas pipeline network feature, and an output of the linkage prediction layer is a linkage abnormality probability of the inspection branching route.

The gas pipeline network feature may be presented in a form of a gas pipeline network diagram. The gas pipeline network diagram refers to a simplified point-line diagram determined according to a connection relationship between gas pipeline networks. In some embodiments, the smart gas safety management platform may determine the gas pipeline network diagram according to relevant information of the gas pipeline network (e.g., an actual distribution of the gas pipeline network) and an inspection situation. A data structure of the gas pipeline network diagram may include nodes and edges.

In some embodiments, the node of the gas pipeline network diagram is an inspection main route and an inspection branching route in a content of an inspection task, and a node feature includes judgment information of whether an inspection has been carried out, and inspection data of inspection branching routes that have been inspected. The edge of the gas pipeline network diagram may be expressed as a connection between the inspection branching route and the inspection main route. An edge feature includes a divergence degree of the inspection branching route, and a location of an intersection point of the inspection branching route and the inspection main route in the inspection main route. The divergence degree of the inspection branching route refers to a ratio of a gas flow of a gas pipeline in the inspection branching route to a gas flow of a gas pipeline in the inspection main route. In some embodiments, the gas pipeline network diagram further includes a mark for the inspection branching route whose abnormality situation needs to be predicted.

In some embodiments, the smart gas safety management platform may determine a comprehensive abnormality probability of the inspection branching route by integrating the abnormality probability of the inspection branching route and the linkage abnormality probability of the inspection branching route (e.g., a linkage abnormality probability of an inspection branching route A corresponds to an abnormality probability of the inspection branching route A). As an example only, the comprehensive abnormality probability may be determined by an average value of the abnormality probability and the linkage abnormality probability. The average value may be a weighted average value, and a weighted weight may be set according to experience or an actual need.

In some embodiments, the smart gas safety management platform may determine the inspection priority of the corresponding inspection branching route based on the comprehensive abnormality probability. For more details on determining the inspection priority, please refer to FIG. 4 and related descriptions.

In some embodiments, the linkage prediction layer may be obtained through a joint training of the abnormality prediction layer and the linkage prediction layer.

In some embodiments, a sample of the joint training may include historical gas monitoring data sequences corresponding to a plurality of historical inspection branching routes, a historical gas pipeline network feature, a historical inspection time interval, historical environmental information, and a historical working time of an inspection target. A label of the joint training may be whether there is an abnormality in the inspection branching route where a historical inspection target is located. If there is an abnormality, the label is 1, and if there is no abnormality, the label is 0. In some embodiments, the label of the joint training may be pre-labeled manually based on a historical situation.

In some embodiments, a process of the joint training may include: inputting the historical gas monitoring data sequence into the data processing layer to obtain the historical data feature; inputting the historical data feature, the historical inspection time interval, the historical environmental information, and the historical working time of an inspection target into an initial abnormality prediction layer; inputting the historical gas pipeline network feature into an initial linkage prediction layer; constructing a loss function based on output results of the initial abnormality prediction layer and the initial linkage prediction layer, and iteratively updating parameters of the initial abnormality prediction layer and the initial linkage prediction layer through gradient descent or other manners, when a training satisfies a preset condition, the trained abnormality prediction layer and linkage prediction layer are obtained. The preset condition may be that the loss function converges, a count of iterations reaches a threshold, or the like.

In some embodiments, the loss function of the joint training includes a first loss item and a second loss item. The first loss item may be a loss value between the label of the joint training and the output of the initial abnormality prediction layer. The second loss item may be a loss value between the label of the joint training and the output of the initial linkage prediction layer.

In some embodiments of the present disclosure, jointly training the abnormality prediction layer and the linkage prediction layer can avoid a problem that the training label is difficult to obtain when the two are trained separately, which is conducive to improving training efficiency and obtaining a more accurate abnormality prediction layer and linkage prediction layer.

In some embodiments of the present disclosure, the abnormality probability of each inspection branching route is determined based on the inspection branching route information and the gas monitoring data, which takes into account a current inspection situation and a situation of the pipeline network device in the inspection branching route, making that an abnormality probability of each inspection branching route can be more in line with an actual situation, improving the accuracy of predicting the abnormality probability, further helping to determine the inspection priority more accurately.

It should be noted that the above descriptions about the process 200, the process 300 and the process 400 are only for illustration and description, and do not limit the scope of application of the present disclosure. For those skilled in the art, various modifications and changes can be made to the process 200, the process 300 and the process 400 under the guidance of the present disclosure. However, such modifications and changes are still within the scope of the present disclosure.

The basic concept has been described above, obviously, for those skilled in the art, the above detailed disclosure is only an example, and does not constitute a limitation to the present disclosure. Although not expressly stated here, those skilled in the art may make various modifications, improvements and corrections to the present disclosure. Such modifications, improvements, and corrections are suggested in the present disclosure, so such modifications, improvements, and corrections still belong to the spirit and scope of the exemplary embodiments of the present disclosure.

Meanwhile, the present disclosure uses specific words to describe the embodiments of the present disclosure. For example, "one embodiment", "an embodiment", and/or "some embodiments" refer to a certain feature, structure, or characteristic related to at least one embodiment of the present disclosure. Therefore, it should be emphasized and noted that two or more references to "one embodiment" or "an embodiment" or "an alternative embodiment" in different places in the present disclosure do not necessarily refer to the same embodiment. In addition, certain features, structures, or characteristics in one or more embodiments of the present disclosure may be properly combined.

In the same way, it should be noted that in order to simplify the expression disclosed in the present disclosure and help the understanding of one or more embodiments of the present disclosure, in the foregoing description of the embodiments of the present disclosure, sometimes multiple features are combined into one embodiment, drawings, or descriptions thereof. This method of disclosure does not, however, imply that the subject matter of the present disclosure requires more features than are recited in the claims. Rather, claimed subject matter may lie in less than all features of a single foregoing disclosed embodiment.

Finally, it should be understood that the embodiments described in the present disclosure are only used to illustrate the principles of the embodiments of the present disclosure. Other modifications are also possible within the scope of the present disclosure. Therefore, by way of example and not limitation, alternative configurations of the embodiments of the present disclosure may be considered consistent with the teachings of the present disclosure. Accordingly, the embodiments of the present disclosure are not limited to the embodiments explicitly introduced and described in the present disclosure.

What is claimed is:

1. A management method for inspection route based on a gas Geographic Information System (GIS), wherein the method is executed by a smart gas safety management platform of an Internet of Things system for managing inspection route based on the gas GIS, the Internet of Things system further including a smart gas user platform, a smart gas service platform, a smart gas sensor network platform, and a smart gas object platform that communicating with each other; the smart gas user platform being configured to a terminal equipment, the smart gas sensor network platform being configured to communication network and gateway, and the smart gas object platform including gas pipe network equipment, monitoring equipment and inspection equipment, comprising:

obtaining, through the smart gas safety management platform, a satellite positioning information of an inspector based on an inspection device; in response to the satellite positioning information satisfying a preset signal condition, determining a reference location of the inspector based on the satellite positioning information; determining track information of the inspector based on an correspondence between the reference location of the inspector and coordinate location on gas pipeline network and station map, wherein the gas pipeline network and station map is obtained based on the gas GIS; wherein the location data is obtained based on the inspection device, the location data including the at least one of satellite positioning information, motion information, or orientation information of the inspector;

in response to the track information satisfying a preset requirement, determining, through the smart gas safety management platform, a recommended inspection route based on the track information and gas monitoring data, and prompting the recommended inspection route through a display screen based on a first display parameter, including:

obtaining inspection branching route information based on a content of an inspection task, wherein the content of the inspection task includes the at least one inspection branching route connected with an inspection main route;

determining a gas monitoring data sequence based on the gas monitoring data; determining an abnormality probability of the at least one inspection branching route according to the gas monitoring data sequence and the inspection branching route information through an abnormality prediction model, wherein the abnormality prediction model is a machine learning model;

wherein the abnormality prediction model includes a data processing layer and an abnormality prediction layer; the data processing layer is a deep neural network (DNN), an input of the data processing layer includes the gas monitoring data sequence, an output of the data processing layer includes a data feature corresponding to the gas monitoring data sequence; and the abnormality prediction layer is a recurrent neural network (RNN), an input of the abnormality prediction layer includes the data feature, a time interval between a current inspection time and a last inspection time, environmental information, and a working time of an inspection target, and an output of the abnormality prediction layer includes the abnormality probability;

determining an inspection priority of the at least one inspection branching route based on the abnormality probability; issuing instructions, determining the recommended inspection route based on the inspection priority and the track information; and in response to the track information not satisfying the preset requirement, generating and issuing, through the smart gas safety management platform, instructions to control a display condition of the display screen based on a second display parameter.

2. The management method according to claim 1, wherein the determining track information of the inspector based on the correspondence between the reference location of the inspector and coordinate location on gas pipeline network and station map further includes:

determining a calculated location of the inspector by using the reference location as a reference based on the motion information and the orientation information;

determining the at least one inspection target near the calculated location that satisfies a preset location condition based on the gas pipeline network and station map;

in response to a count of the at least one inspection target satisfying a preset count requirement, obtaining at least one image of the at least one inspection target by a photographing device; and determining the track information of the inspector based on the at least one image of the at least one inspection target and the calculated location.

3. The management method according to claim 2, wherein the determining the track information of the inspector based on the at least one image of the at least one inspection target and the calculated location includes:

determining an actual location of the at least one inspection target by performing image matching in an inspection target database based on the at least one image of the at least one inspection target;

determining at least one precise location of the inspector by combining with the actual location of the at least one inspection target based on a relative location relationship between the at least one inspection target and the photographing device; and determining the track information of the inspector according to the at least one precise location and the calculated location.

4. The management method according to claim 1, wherein the abnormality prediction model further includes a linkage prediction layer;

an input of the linkage prediction layer includes a gas pipeline network feature, and an output of the linkage prediction layer is a linkage abnormality probability of the at least one inspection branching route;

the gas pipeline network feature is presented in a form of a gas pipeline network diagram, and the gas pipeline network diagram includes nodes and edges;

the nodes of the gas pipeline network diagram are the inspection main route and the at least one inspection branching route in the content of the inspection task, and a node feature includes judgment information of whether an inspection has been carried out, and inspection data of the at least one inspection branching routes that have been inspected;

the edges of the gas pipeline network diagram are a connection between the at least one inspection branching route and the inspection main route, and an edge feature includes a divergence degree of the at least one inspection branching route, and a location of an intersection point of the at least one inspection branching route and the inspection main route in the inspection main route, wherein the divergence degree of the at least one inspection branching route is a ratio of a gas flow of a gas pipeline in the at least one inspection branching route to a gas flow of a gas pipeline in the inspection main route.

5. The management method according to claim 4, wherein the abnormality prediction layer and the linkage prediction layer are obtained through a joint training, and a loss function of the joint training includes a first loss item and a second loss item;

the first loss item is a loss value between a label of the joint training and an output of an initial abnormality prediction layer; and the second loss item is a loss value between the label of the joint training and an output of the initial linkage prediction layer.

6. The management method according to claim 1, wherein the determining, through the smart gas safety management platform, the recommended inspection route based on the track information and the gas monitoring data further includes:

identifying an inspection phase of the inspector;

in response to the inspection phase being a first phase, obtaining a remote inspection branching route based on at least one precise location of the inspector; and determining the recommended inspection route according to a preset inspection rule based on the inspection priority of the remote inspection branching route.

7. The management method according to claim 6, wherein the preset inspection rule is related to a count of the at least one inspection target of the remote inspection branching route.

8. An Internet of Things system for managing inspection route based on a gas Geographic Information System (GIS), wherein the Internet of Things system includes a smart gas safety management platform, the Internet of Things system further including a smart gas user platform, a smart gas service platform, a smart gas sensor network platform, and a smart gas object platform that communicates with each other; the smart gas user platform is configured to a terminal equipment, the smart gas sensor network platform is configured to communication network and gateway, and the smart gas object platform including gas pipe network equipment, monitoring equipment and inspection equipment, and the smart gas safety management platform is configured to:

obtain, through the smart gas safety management platform, a satellite positioning information of an inspector based on an inspection device; in response to the satellite positioning information satisfying a preset signal condition, determine a reference location of the inspector based on the satellite positioning information; determine track information of the inspector based on an correspondence between the reference location of the inspector and coordinate location on gas pipeline network and station map, wherein the gas pipeline network and station map is obtained based on the gas GIS; wherein the location data is obtained based on the inspection device, the location data including at least one of satellite positioning information, motion information, or orientation information of the inspector; and in response to the track information satisfying a preset requirement, determine, through the smart gas safety management platform, a recommended inspection route based on the track information and gas monitoring data, and prompt the recommended inspection route through a display screen based on a first display parameter, including:

obtain inspection branching route information based on a content of an inspection task, wherein the content of the inspection task includes the at least one inspection branching route connected with an inspection main route;

determine a gas monitoring data sequence based on the gas monitoring data; determine an abnormality probability of the at least one inspection branching route according to the gas monitoring data sequence and the inspection branching route information through an abnormality prediction model, wherein the abnormality prediction model is a machine learning model;

wherein the abnormality prediction model includes a data processing layer and an abnormality prediction layer; the data processing layer is a deep neural network (DNN), an input of the data processing layer includes the gas monitoring data sequence, an output of the data processing layer includes a data feature corresponding to the gas monitoring data sequence; and the abnormality prediction layer is a recurrent neural network (RNN), an input of the abnormality prediction layer includes the data feature, a time interval between a current inspection time and a last inspection time, environmental information, and a working time of an inspection target, and an output of the abnormality prediction layer includes the abnormality probability;

determine an inspection priority of the at least one inspection branching route based on the abnormality probability;

determine the recommended inspection route based on the inspection priority and the track information; and in response to the track information not satisfying the preset requirement, generate and issue, through the smart gas safety management platform, instructions to control a display condition of the display screen based on a second display parameter.

9. The Internet of Things system according to claim 8, wherein the Internet of Things system further includes;

the smart gas safety management platform includes a smart gas pipeline network safety management sub-platform and a smart gas data center;

the smart gas service platform includes a smart gas usage service sub-platform and a smart supervision service sub-platform;

the smart gas object platform is configured to obtain the gas monitoring data, and upload the gas monitoring data to the smart gas data center of the smart gas safety management platform through the smart gas sensor network platform;

the smart gas pipeline network safety management sub-platform is configured to determine the recommended inspection route, and transmit the recommended inspection route to the smart gas data center;

the smart gas data center is configured to transmit the recommended inspection route to the smart gas service platform; and the smart gas service platform is configured to transmit the recommended inspection route to the smart gas user platform.

10. The Internet of Things system according to claim 8, wherein the smart gas safety management platform is further configured to:
- determine a calculated location of the inspector by using the reference location as a reference according to the motion information and the orientation information;
- determine the at least one inspection target near the calculated location that satisfies a preset location condition based on the gas pipeline network and station map;
- in response to a count of the at least one inspection target satisfying a preset count requirement, obtain at least one image of the at least one inspection target by a photographing device; and
- determine the track information of the inspector based on the at least one image of the at least one inspection target and the calculated location.

11. The Internet of Things system according to claim 10, wherein the smart gas safety management platform is further configured to:
- determine an actual location of the at least one inspection target by performing image matching in an inspection target database based on the at least one image of the at least one inspection target;
- determine at least one precise location of the inspector by combining with the actual location of the at least one inspection target based on a relative location relationship between the at least one inspection target and the photographing device; and
- determine the track information of the inspector according to the at least one precise location and the calculated location.

12. The Internet of Things system according to claim 8, wherein the smart gas safety management platform is further configured to:
- identify an inspection phase of the inspector;
- in response to the inspection phase being a first phase, obtain a remote inspection branching route based on at least one precise location of the inspector; and
- determine the recommended inspection route according to a preset inspection rule based on the inspection priority of the remote inspection branching route.

* * * * *